(12) United States Patent
Pluta et al.

(10) Patent No.: US 10,605,332 B2
(45) Date of Patent: Mar. 31, 2020

(54) PLANETARY GEAR CARRIER WITH COMPLIANCE

(71) Applicant: BorgWarner Inc., Auburn Hills, MI (US)

(72) Inventors: Christopher J. Pluta, Lansing, NY (US); Michael Marsh, Dryden, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 282 days.

(21) Appl. No.: 15/701,884

(22) Filed: Sep. 12, 2017

(65) Prior Publication Data

US 2018/0073598 A1   Mar. 15, 2018

Related U.S. Application Data

(60) Provisional application No. 62/394,197, filed on Sep. 13, 2016.

(51) Int. Cl.
*F16H 1/28*     (2006.01)
*F16H 57/08*    (2006.01)
(Continued)

(52) U.S. Cl.
CPC ............ *F16H 1/2863* (2013.01); *F01L 1/352* (2013.01); *F16H 57/082* (2013.01); *F16H 57/12* (2013.01);
(Continued)

(58) Field of Classification Search
CPC ................. F16H 1/2863; F16H 57/082; F16H 2057/127; F16H 2057/125; F01L 1/352
See application file for complete search history.

(56) References Cited

U.S. PATENT DOCUMENTS

| 4,799,396 A | * | 1/1989 | Ito | .......................... F16H 1/2863 |
| | | | | 475/331 |
| 5,098,359 A | * | 3/1992 | Chales | ................. B60N 2/2251 |
| | | | | 297/362 |

(Continued)

FOREIGN PATENT DOCUMENTS

| DE | 102012207250 A1 | * | 11/2013 | ........... F16H 1/2863 |
| DE | 102012210465 A1 | * | 12/2013 | ........... F16H 57/082 |
| DE | 102012211286 A1 | * | 1/2014 | ........... F16H 57/082 |

*Primary Examiner* — Sherry L Estremsky
(74) *Attorney, Agent, or Firm* — Reising Ethington P.C.

(57) ABSTRACT

A planetary gear assembly (30) and method of assembly in an electric camshaft phaser (20) with a split ring gear including a drive-side ring gear portion (32) rotatable by an engine crankshaft and an output-side ring gear portion (34) that can be connected to a camshaft (22). A plurality of rotatable planetary gears (36a, 36b, 36c) can be interposed between the split ring gear and the sun gear (28). The output-side ring gear portion (34) can have a different number of teeth than the drive-side ring gear portion (32) by a value corresponding to a multiple of the number of planetary gears (36a, 36b, 36c). A compliant planetary gear carrier (40, 140) can support the plurality of planetary gears (36a, 36b, 36c) allowing variance of a normally equidistant distance between separate spaced rotational axes of at least two of the planetary gears (36a, 36b, 36c) to selectively compensate for mechanical tolerances of the drive-side ring gear portion (32) and the output-side ring gear portion (34) of the split ring gear.

15 Claims, 2 Drawing Sheets

(51) Int. Cl.
*F01L 1/352* (2006.01)
*F16H 57/12* (2006.01)

(52) U.S. Cl.
CPC ..... *F01L 2810/04* (2013.01); *F01L 2820/032* (2013.01); *F16H 2057/125* (2013.01); *F16H 2057/127* (2013.01)

(56) References Cited

U.S. PATENT DOCUMENTS

| | | | |
|---|---|---|---|
| 6,543,399 B2* | 4/2003 | Heer | F01L 1/352 123/90.11 |
| 6,971,352 B2* | 12/2005 | Meintschel | F01L 1/022 123/90.15 |
| 7,261,667 B2 | 8/2007 | Berger | |
| 7,506,623 B2* | 3/2009 | Schafer | F01L 1/352 123/90.11 |
| 8,313,411 B2 | 11/2012 | Schafer | |
| 9,366,317 B2* | 6/2016 | Croce | F16H 57/082 |
| 9,862,405 B2* | 1/2018 | Park | B62D 5/008 |
| 10,006,321 B2* | 6/2018 | Simpson | F01L 1/352 |
| 10,036,450 B2* | 7/2018 | Chhour | F16H 57/082 |
| 10,233,999 B2* | 3/2019 | McCloy | F16H 1/2863 |
| 10,344,825 B2* | 7/2019 | Wigsten | F16H 1/2863 |
| 2007/0179011 A1* | 8/2007 | Choi | B62D 5/008 475/331 |

* cited by examiner

PLANETARY GEAR CARRIER WITH COMPLIANCE

CROSS-REFERENCE TO RELATED APPLICATIONS

This application claims the benefit of U.S. Patent Application No. 62/394,197 filed on Sep. 13, 2016, the disclosure of which is herein incorporated by reference in its entirety.

FIELD OF THE INVENTION

The invention relates to a gear system, and more particularly to a planetary gear assembly having compliance for taking up lash in the planetary gear train.

BACKGROUND

There is a desire to provide a planetary gear assembly having a planetary gear carrier with compliance to allow for reduced mechanical tolerances of ring gears during meshing engagement of the ring gears with the planetary gears.

SUMMARY

A planetary gear assembly can have at least one ring gear, a sun gear, and a plurality of rotatable planetary gears radially interposed between the at least one ring gear and the sun gear. Each of the plurality of planetary gears can have a separate spaced rotational axis with respect to other planetary gears. The planetary gear assembly can include a compliant planetary gear carrier supporting the plurality of planetary gears for rotation. The compliant planetary gear carrier can have at least one biasing member connected between the rotational axes of at least two of the plurality of planetary gears allowing variance of a normally equidistant distance between the rotational axes of the at least two of the plurality of planetary gears selectively compensating for mechanical tolerances of the at least one ring gear.

A planetary gear assembly in an electric camshaft phaser can include a split ring gear including a drive-side ring gear portion for driven rotation by an engine crankshaft and an output-side ring gear portion, a sun gear located concentric with respect to the split ring gear along a longitudinal axis for driven rotation by a rotatable electric motor, and the output-side ring gear portion located concentric with respect to the sun gear for driving connection to a camshaft. The electric motor can be rotatable at a speed equal with respect to the output-side ring gear portion to maintain a constant phase position of the camshaft with respect to the crankshaft. The electric motor can be rotatable at a varying speed with respect to the output-side ring gear portion during a cam phase change of the camshaft with respect to the crankshaft. A plurality of rotatable planetary gears can be radially interposed between the sun gear and the split ring gear including the drive-side ring gear portion and the output-side ring gear portion. Each of the plurality of planetary gears can have a rotational axis. The output-side ring gear portion can have a different number of teeth with respect to the drive-side ring gear portion by a value corresponding to a multiple of the number of planetary gears. A compliant planetary gear carrier can support each of the plurality of planetary gears for rotation. The compliant planetary gear carrier can allow variance of a normally equidistant distance between the rotational axes of at least two of the plurality of planetary gears to selectively compensate for mechanical tolerances of the split ring gear including the drive-side ring gear portion and the output-side ring gear portion.

A planetary gear assembly can be assembled in an electric camshaft phaser for dynamically adjusting a rotational relationship of a camshaft of an internal combustion engine with respect to an engine crankshaft. The camshaft phaser can include a planetary gear assembly having a split ring gear including a drive-side ring gear portion operably driven by the crankshaft through an endless loop power transmission member and an output-side ring gear portion, a plurality of planetary gears, and a sun gear centrally located and operably driven by an electric motor. Each of the plurality of planetary gears can have a rotational axis. The method can include mounting the split ring gear including the drive-side ring gear portion and the output-side ring gear portion concentrically with respect to the sun gear, the output-side ring gear portion for connection to the camshaft, positioning a compliant planetary gear carrier supporting the plurality of planetary gears for rotation, and meshingly interposing the plurality of rotatable planetary gears between the sun gear and the split ring gear including the output-side ring gear portion and the drive-side ring gear portion. The output-side ring gear portion can have a different number of teeth with respect to the drive-side ring gear portion by a value corresponding to a multiple of the number of planetary gears. The electric motor can be rotatable at a speed equal with respect to the output-side ring gear portion to maintain a constant phase position of the camshaft with respect to the crankshaft, and rotatable at a varying speed with respect to the output-side ring gear portion during a cam phase change of the camshaft with respect to the crankshaft. The compliant planetary gear carrier can allow variance of a normally equidistant distance between the rotational axes of at least two of the plurality of planetary gears to selectively compensate for mechanical tolerances of the drive-side ring gear portion and the output-side ring gear portion.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The current state of the art for automotive Camshaft Phasers is either an Oil Pressure Actuated (OPA) camshaft phaser or a Cam Torque Actuated (CTA) camshaft phaser with the later having some advance features such as fast operation with low oil pressure and a mid-position lock feature. Many automotive companies are now working on Electric Actuated camshaft phasers to improve the actuation rate and range of authority and operation either before engine start or during engine cranking. These systems have a high ratio gear train and can phase the camshaft relative to the crankshaft by means of a motor spinning at camshaft speed. As the motor spins faster than the camshaft, the phaser will phase the camshaft relative to the crankshaft in one direction and as the motor slows down the camshaft to crankshaft phase will move in the opposite direction.

These gear trains include a cyclodial style gear train, a harmonic gear train, or some other type of high ratio epicyclical gear train. A split ring gear epicyclical gear system is provided, where the tooth count on one of the ring gear portions has a difference in tooth count equal to the number of planets used. The split ring gear train is mounted on the camshaft and as a result sees the camshaft torsional load as the camshaft rotates. The torque path is from one ring gear to the planet gear and to the other ring gear. These gear trains can have noise issues because of the oscillating torque loads as the input torque oscillates back and forth causing the two ring gears to load and unload against the planetary gears.

One solution to mitigate noise is to make very precise gears and reduce the carrier center distance such that the backlash of the ring gears to the planetary gear is greatly reduced. This means that the roundness of the ring gear must be held very tight otherwise binding can occur. This method can be expensive as the cost of these precise gears and select fit parts can make the assembly cost prohibitive.

Figure 2:
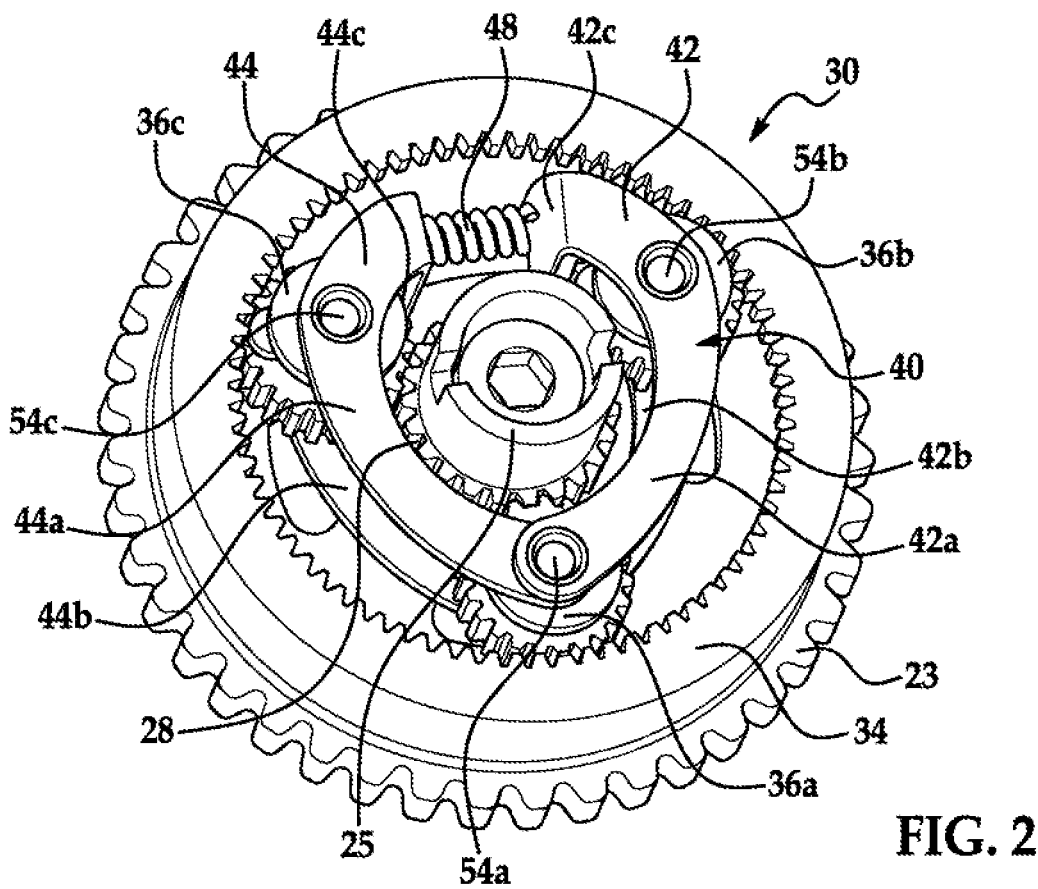
FIG. 2 is a perspective sectional view of a planetary gear assembly having a compliant planetary gear carrier supporting the plurality of planetary gears for rotation illustrating a first rigid link and a second rigid link connected for pivoting movement relative to one another and a spring engageable between outer ends of the first and second rigid links allowing variance of a normally equidistance between two of the plurality of planetary gears to selectively compensate for mechanical tolerances of the drive-side ring gear portion and the output-side ring gear portion of the split ring gear.

One solution to reduce backlash is to make a center pivot carrier where there is compliance between two of the planetary gears, see FIG. 2. This compliance can be taken up with a biasing member, such as a spring, such that the planetary gears will be pushed against and into the two rings. Any out of roundness of the ring gears and planetary gears will simply cause the gap between the two compliant gears to vary slightly without binding. The spring rate can be adjusted so the added drag can be minimized and still provide an effective backlash and noise mitigation solution.

Installation of this carrier system into the ring gear assembly is easy as the carrier can be squeezed together, inserted and then released. This system is designed such that there is a center pivot between two of the rigidly held arms of the carrier. This system also allows for reduced tolerances as the spring between the two arms will take up any backlash in the system.

Figure 3:
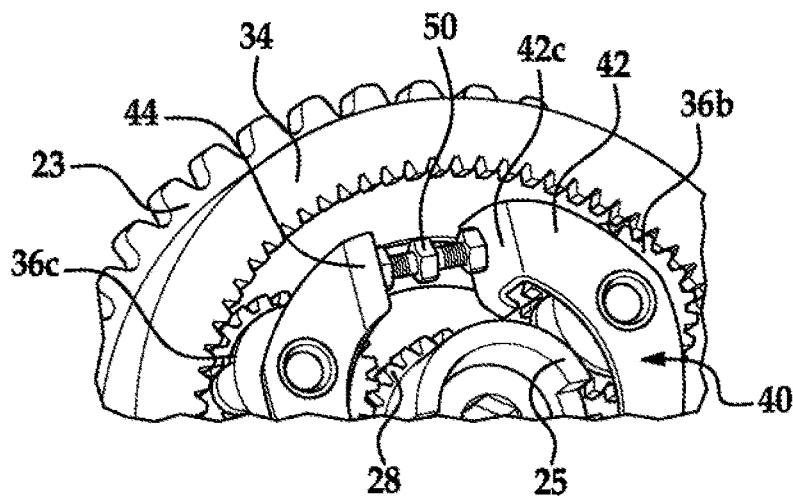
FIG. 3 is a partial sectional view of the planetary gear assembly of FIG. 2 showing a jack screw engageable between the first and second rigid links of the compliant planetary gear carrier, where the jack screw is adjustable during assembly of the planetary gear assembly and fixed in position after assembly of the planetary gear assembly.

One alternative to this design is to replace the spring with an adjustment jack screw, such that the screw could be adjusted in situ and then locked in place once it is assembled into the ring gears, see FIG. 3. This would reduce the backlash and reduce the drag that would be caused by the spring.

Figure 4:
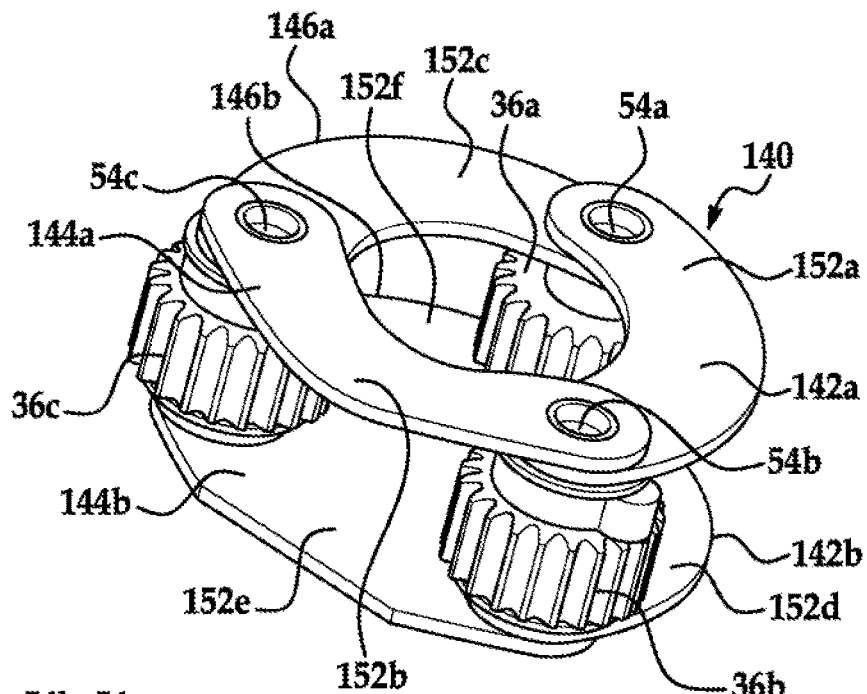
FIG. 4 is a perspective view of the planetary gear assembly of FIG. 2 having a compliant planetary gear carrier for supporting the plurality of rotatable planetary gears showing a plurality of blade spring links, each blade spring link pivotally connected between two rotational axes of the plurality of planetary gears.
Figure 5:
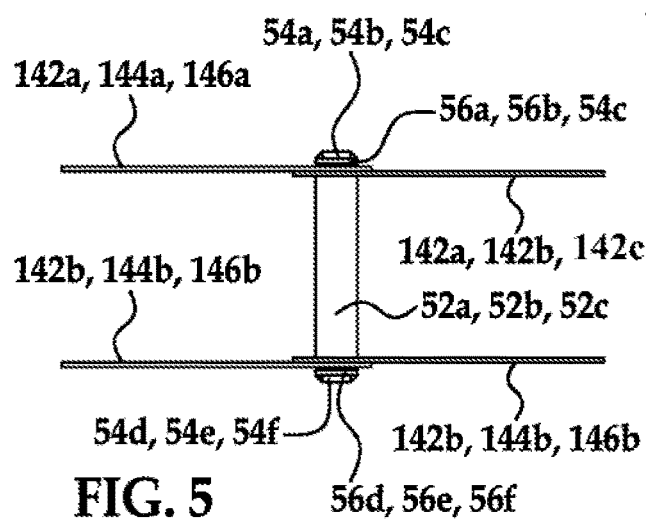
FIG. 5 is a detailed side view of the plurality of blade spring links of FIG. 4 showing a shoulder pin, washer, and crimp supporting the plurality of blade spring links for pivot movement relative to one another in the compliant planetary gear carrier.

Another alternate to this design provides for this compliance to be taken up with blade spring links or straps, such that the planetary gears will be pushed against and into the two rings, see FIGS. 4-5. Any out of roundness of the ring gears and planetary gears will simply cause the gap between the two compliant gears to vary slightly without binding. The blade spring rate of the links, or straps, can be adjusted so the added drag can be minimized and still provide an effective backlash and noise mitigation solution.

An alternate design for the carrier could have all three sets of blades be pre-bent so that each set pushes the planetary gear into the ring gears. This would not require a center pivot on the carrier as each leg would have compliance and could take up any out of roundness as the planetary gears rotate. The design could be made such that any type of spring could be used to add this compliance not just blade springs. Installation of this carrier system into the ring gear assembly is easy as the carrier can be squeezed together, inserted and then released. These two systems allow for reduced tolerances of the ring and planetary gears and the center distance of the carrier pins as the blade spring(s) will take up any backlash in the system.

Referring now to FIGS. 1-5, a planetary gear assembly 30 can include at least one ring gear 32, 34, a sun gear 28, and a plurality of rotatable planetary gears 36a, 36b, 36c radially interposed between the at least one ring gear 32, 34 and the sun gear 28. Each of the plurality of planetary gears 36a, 36b, 36c can have a separate spaced rotational axis with respect to other planetary gears 36a, 36b, 36c. The planetary gear assembly 30 can include a compliant planetary gear carrier 40, 140 supporting the plurality of planetary gears 36a, 36b, 36c for rotation and connected between each rotational axis of the plurality of planetary gears 36a, 36b, 36c. The compliant planetary gear carrier 40, 140 can have at least one biasing member 48, 142a, 142b, 144a, 144b, 146a, 146b connected between the rotational axes of two of the plurality of planetary gears 36a, 36b, 36c allowing variance of a normally equidistant distance between the rotational axes of two of the plurality of planetary gears 36a, 36b, 36c selectively compensating for mechanical tolerances of the at least one ring gear 32, 34. The at least one ring gear 32, 34 can include a split ring gear including a drive-side ring gear portion 32 for driven rotation by a first shaft and an output-side ring gear portion 34 located concentric with respect to the sun gear 28 for driving connection to a second shaft 22. The output-side ring gear portion 34 can have a different number of teeth with respect to the drive-side ring gear portion 32 by a value corresponding to a multiple of the number of planetary gears 36a, 36b, 36c to provide tooth alignment at an engagement position of each of the planetary gears 36a, 36b, 36c.

Figure 1:
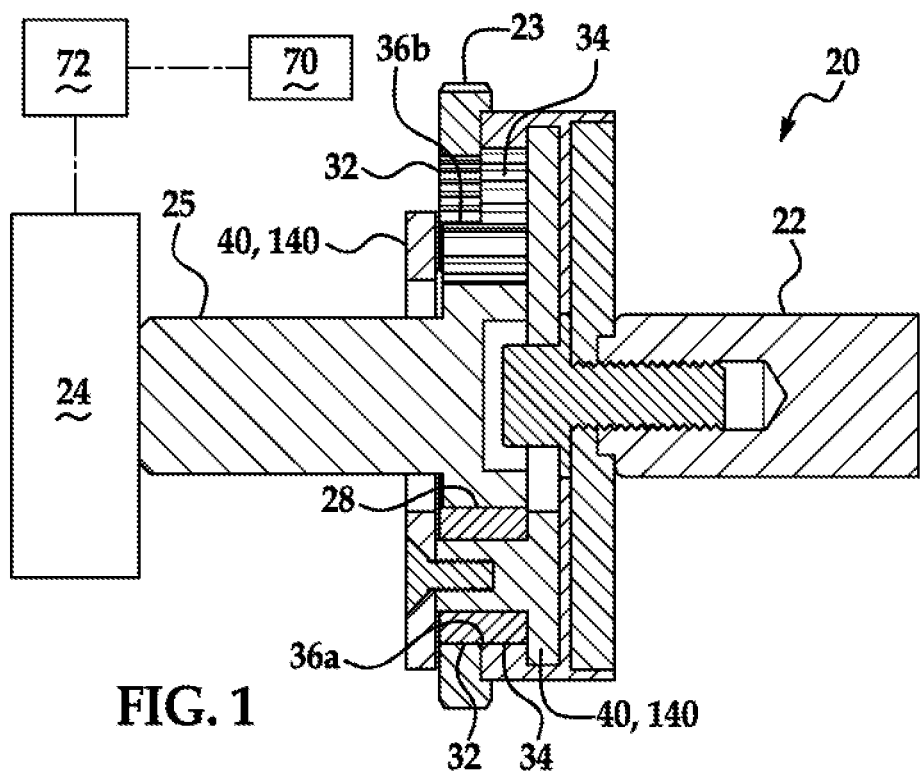
FIG. 1 is a cross sectional view of a camshaft phaser with a planetary gear assembly having a split ring gear including a drive-side ring gear portion for driven rotation by a crankshaft and an output-side ring gear portion, a plurality of planetary gears, a sun gear centrally located with respect to the plurality of planetary gears, and the output-side ring gear portion located concentric with respect to the sun gear for driving connection to the camshaft and having a different number of teeth compared with the drive-side ring gear portion by a value corresponding to a multiple of the number of planetary gears to provide tooth alignment at an engagement position of each of the planetary gears.

Referring now to FIG. 1, the planetary gear assembly 30 can be part of an assembled electric camshaft phaser 20 for dynamically adjusting a rotational relationship of a camshaft 22 of an internal combustion engine with respect to an engine crankshaft (not shown). The planetary gear assembly 30 can include a plurality of planetary gears 36a, 36b, 36c and a sun gear 28 centrally located with respect to the plurality of planetary gears 36a, 36b, 36c. The planetary gear assembly 30 can include a split ring gear having a drive-side ring gear portion 32 and an output-side ring gear portion 34. The plurality of planetary gears 36a, 36b, 36c can be radially interposed between the sun gear and the split ring gear including the output-side ring gear portion 34 and the drive-side ring gear portion 32. The drive-side ring gear portion 32 can be driven for rotation by the crankshaft through an endless loop power transmission member (not shown) and the output-side ring gear portion 34 can be located concentric with respect to the sun gear 28 and for driving connection to the camshaft 22. The endless loop power transmission member driven by the engine crankshaft can be engageable with teeth of a sprocket 23. The sprocket 23 can be connected to gear teeth of the drive-side ring gear portion 32 and can be piloted radially by the output-side ring gear portion 34. The number of teeth on the drive-side ring gear portion 32 can be greater than or less than the number of teeth on the output-side ring gear portion 34, where the difference in number of teeth is a multiple of the number of planetary gears 36a, 36b, 36c. The tooth number variance allows each of the planetary gears 36a, 36b, 36c to have tooth alignment at the engagement position. Each of the plurality of planetary gears 36a, 36b, 36c can have a separate spaced rotational axis with respect to other planetary gears 36a, 36b, 36c. The drive-side ring gear portion 32 and the output-side ring gear portion 34 can have a different number of teeth with respect to one another, where the difference in the number of teeth equals a multiple of the number of planetary gears 36a, 36b, 36c. The gear teeth of the split ring gear including the drive-side ring gear portion 32 and the output-side ring gear portion 34 can have modified profiles to allow the drive-side ring gear portion 32 and the output-side ring gear portion 34 to mesh properly with the plurality of planetary gears 36a, 36b, 36c.

As best shown in FIG. 1, the planetary gear assembly 30 can include an electric motor 24 for driving connection to the sun gear 28 for driving the sun gear 28 relative to the plurality of planetary gears 36a, 36b, 36c. The electric motor 24 can include an output shaft 25 secured to the sun gear 14. The electric motor 24 can be rotatable at a speed equal with respect to the output-side ring gear portion 34 to maintain a constant phase position of the camshaft with respect to the crankshaft. The electric motor 24 can be rotatable at a varying speed with respect to the output-side ring gear portion 34 during a cam phase change of the camshaft with respect to the crankshaft. A high numerical ratio can be obtained and the camshaft 22 can be phased either plus or minus from a nominal rotational relationship of the crankshaft to the camshaft 22. When the motor runs at the same speed as the output-side ring gear portion 34, cam phasing does not occur. Increasing or decreasing the speed of the electric motor 24 relative to the output-side ring gear portion 34 will cause the indexing or phasing function of the planetary gear assembly 30.

A sensor 70 can be used as feedback to a motor controller 72 to measure a current position of the sprocket 23 to the camshaft 22 to determine what adjustment, if any, is desired at any point in time to achieve optimal engine efficiency. The adjustment of the cam phasing angle can be done with the planetary gear assembly 30 which can provide a high numerical ratio such that the cam phasing angle can be adjusted accurately with a relatively low driving torque of the adjusting electric motor 26. When the engine is running and the cam phase is not being adjusted the camshaft phaser 20 can rotate as a unit which minimizes frictional losses. When the engine is running and the cam phase is not being adjusted, the electric motor 24 can be driven at the same speed as the camshaft 22 to maintain a constant cam phase position. When the engine is running and the cam phase needs to be adjusted the electric motor 24 can be driven at a speed not equal to the rotational speed of the output-side ring gear portion 34 to cause a cam phase shift function of the camshaft with respect to the crankshaft to occur in either the advancing or retarding directions with the output-side ring gear portion 34. By way of example and not limitation, it is contemplated that a split ring planetary cam phaser as disclosed in commonly owned International Publication No. WO 2014/092963 A1 published Jun. 19, 2014 would be suitable for use in the present invention. A complete description of the structure, function, and operation of a split ring planetary cam phaser can be found in commonly owned International Publication No. WO 2014/092963 A1 published Jun. 19, 2014, which is incorporated by reference herein in its entirety.

Referring now to FIGS. 2-5, the planetary gear assembly 30 can include a compliant planetary gear carrier 40, 140 supporting the plurality of planetary gears 36a, 36b, 36c for rotation. The compliant planetary gear carrier 40, 140 can allow variance of a normally equidistant distance between separate spaced rotational axes of at least two of the plurality of planetary gears 36a, 36b, 36c to selectively compensate for mechanical tolerances of the drive-side ring gear portion 32 and the output-side ring gear portion 34 of the split ring gear. Referring now to FIGS. 2-3, the planetary gear carrier 40 can include a first rigid link 42 and a second rigid link 44 connected for pivoting movement with respect to the rotational axis of the first planetary gear 36a. The first rigid link 42 can be connected between a first rotational axis of the first planetary gear 36a and a second rotational axis of a second planetary gear 36b. As best seen in FIG. 2, the first rigid link 42 can include a first arcuate planar wall portion 42a and a second arcuate planar wall portion 42b axially separated and connected by a first end wall portion 42c. The first rigid link 42 can support the second planetary gear 36b for slight movement with respect to the first planetary gear 36a. The second planetary gear 36b can be axially interposed between the first arcuate wall portion 42a and the second arcuate wall portion 42b of the first rigid link 42. The second rigid link 44 can be connected between the first rotational axis of the first planetary gear 36a and a third rotational axis of a third planetary gear 36c. The second rigid link 44 can include a third arcuate wall portion 44a and a fourth arcuate wall portion 44b axially separated and connected by a second end wall portion 44c. The second rigid link 44 can support the third planetary gear 36c for slight movement with respect to the first planetary gear 36a. The third planetary gear 36c can be axially interposed between the third arcuate wall portion 44a and the fourth arcuate wall portion 44b of the second rigid link 44.

Referring now to FIG. 2, a spring 48 can be engageable between the first rigid link 42 and the second rigid link 44 allowing pivoting movement of the first rigid link 42 and the second rigid link 44 with respect to the first rotational axis of the first planetary gear 36a. The spring 48 can be engageable between the first and second end walls 42c, 44c of the first rigid link 42 and the second rigid link 44 respectively. The pivoting movement of one of the first rigid link 42 and the second rigid link 44 can allow variance of a normally equidistant distance between the separate spaced rotational axes of two of the plurality of planetary gears 36a, 36b, 36c to selectively compensate for mechanical tolerances of the drive-side ring gear portion 32 and the output-side ring gear portion 34 during meshing engagement of the plurality of planetary gears 36a, 36b, 36c with the drive-side ring gear portion 32 and the output-side ring gear portion 34 of the split ring gear. During oscillation of input torque of the planetary gear assembly 30, the output-side ring gear portion 34 can load and unload against the plurality of planetary gears 36a, 36b, 36c causing backlash. The spring 48 can reduce backlash by allowing the plurality of planetary gears 36a, 36b, 36c to be radially forced against and into the drive-side ring gear portion 32 and the output-side ring gear portion 34 of the split ring gear. The spring 48 can allow a space between at least two of the plurality of planetary gears 36a, 36b, 36c to be varied preventing binding of the plurality of planetary gears with the drive-side ring gear portion 32 and the output-side ring gear portion 34. By way of example and not limitation, the spring 48 can be a compression spring.

Referring now to FIG. 3, a jack screw 50 can be engageable between the first rigid link 42 and the second rigid link 44. The jack screw 50 can be engageable between the first and second end walls 42c, 44c of the first rigid link 42 and the second rigid link 44 respectively. The jack screw 50 can be adjustable during assembly of the planetary gear assembly 30 and fixed after the plurality of planetary gears 36a, 36b, 36c are assembled for meshing engagement between the output-side ring gear portion 34 and the sun gear portion 28.

By way of example and not limitation, the compliant planetary gear carrier 40 can include a plurality of shoulder pins corresponding in number to the plurality of planetary gears. Each of the plurality of shoulder pins can be located along the rotational axis of the corresponding one of the plurality of planetary gears 36a, 36b, 36c. Each of the plurality of planetary gears 36a, 36b, 36c can be mounted for rotation on a corresponding one of the plurality of shoulder pins. Each of the first arcuate wall portion 42a and the second arcuate wall portion 42b of the first rigid link 42, and the third arcuate wall portion 44a and the fourth arcuate wall portion 44b of the second rigid link 44, can be mounted to the corresponding one of the plurality of shoulder pins. As best seen in FIG. 2, the compliant planetary gear carrier 40 can include a plurality of crimp rings 54a, 54b, 54c and washers 56a, 56d; 56b, 56e; 56c, 56f corresponding to the plurality of shoulder pins. Each of the plurality of crimp rings 54a, 54b, 54c and washers 56a, 56d; 56b, 56e; 56c, 56f can be mounted at ends of the corresponding one of the plurality of shoulder pins. The plurality of crimp rings 54a, 54b, 54c can fasten the first and second links 42, 44 to the corresponding plurality of shoulder pins. The plurality of washers 56a, 56b, 56c, 56d, 56e, 56f can allow pivoting movement of the first and second rigid links 42, 44 with respect to the corresponding one of the plurality of shoulder pins to which the first planetary gear 36a is mounted for rotation.

Referring now to FIGS. 4-5, the compliant planetary gear carrier 140 can include a plurality of blade spring links 142a, 142b, 144a, 144b, 146a, 146b. Each of the plurality of blade spring links 142a, 142b, 144a, 144b, 146a, 146b can be connected between the rotational axes of two of the plurality of planetary gears 36a, 36b, 36c. A pair of first blade spring links 142a, 142b can support a first planetary gear 36a and a second planetary gear 36b. The first planetary gear 36a and the second planetary gear 36b can be interposed between the pair of first blade spring links 142a, 142b. The first and second planetary gears 36a, 36b can be pivotally connected for rotation about separate spaced rotational axes between a first rotational axis of the first planetary gear 36a and a second rotational axis of the second planetary gear 36b. A pair of second blade spring links 144a, 144b can support the second planetary gear 36b and a third planetary gear 36c. The second planetary gear 36b and the third planetary gear 36c can be interposed between the pair of second blade spring links 144a, 144b. The second and third planetary gears 36b, 36c can be pivotally connected for rotation about separate spaced rotational axes between the second rotational axis of the second planetary gear 36b and a third rotational axis of the third planetary gear 36c. A pair of third blade spring links 146a, 146b can support the first planetary gear 36a and the third planetary gear 36c. The first and third planetary gear can be interposed between the pair of third blade spring links 146a, 146b. The first and third planetary gears 36a, 36c can be pivotally connected for rotation about separate spaced rotational axes between the first rotational axis of the first planetary gear 36a and the third rotational axis of the third planetary gear 36c.

By way of example and not limitation, the compliant planetary gear carrier 140 can include a plurality of shoulder pins 52a, 52b, 52c corresponding in number to the plurality of planetary gears 36a, 36b, 36c. Each of the plurality of shoulder pins 52a, 52b, 52c can be located along the rotational axis of the corresponding one of the plurality of planetary gears 36a, 36b, 36c. Each of the plurality of planetary gears 36a, 36b, 36c can be mounted for rotation on a corresponding one of the plurality of shoulder pins 52a, 52b, 52c. Each of the plurality of blade spring links 142a, 142b, 144a, 144b, 146a, 146c can be mounted to the corresponding one of the plurality of shoulder pins 52a, 52b, 52c. The compliant planetary gear carrier 140 can include a plurality of crimp rings 54a, 54b, 54c, 54d, 54e, 54f and washers 56a, 56b, 56c, 56d, 56e, 56f corresponding to the plurality of shoulder pins 52a, 52b, 52c. Each of the plurality of crimp rings 54a, 54b, 54c, 54d, 54e, 54f and washers 56a, 56b, 56c, 56d, 56e, 56f can be mounted at ends of the corresponding one of the plurality of shoulder pins 52a, 52b, 52c. The plurality of crimp rings 54a, 54b, 54c, 54d, 54e, 54f can fasten ends of the plurality of blade spring links 142a, 142b, 144a, 144b, 146a, 146b to the corresponding one of the plurality of shoulder pins 52a, 52b, 52c. Each of the plurality of blade spring links 142a, 142b, 144a, 144b, 146a, 146b can include ends located distally opposite with respect to one another. Each of the ends can be fastened to a corresponding one of the plurality of shoulder pins 52a, 52b, 52c. The plurality of washers 56a, 56b, 56c, 56d, 56e, 56f can allow pivoting movement of each of the planetary gears 36a, 36b, 36c with respect to the plurality of blade spring links 142a, 142b, 144a, 144b, 146a, 146b and the corresponding one of the plurality of shoulder pins 52a, 52b, 52c. Each of the plurality of blade spring links 142a, 142b, 144a, 144b, 146a, 146b can include a flexible portion 152a, 152b, 152c, 152d, 152e, 152f extending between fastened opposite ends of each of the plurality of blade spring links 142a, 142b, 144a, 144b, 146a, 146b. The flexible portions 152a, 152b, 152c, 152d, 152e, 152f of each of the plurality of blade spring links 142a, 142b, 144a, 144b, 146a, 146b can be normally biased toward a planar shape. The flexible portions 152a, 152b, 152c, 152d, 152e, 152f can be flexibly urged axially inwardly to decrease an equidistant dimension between the first, second, and third rotational axes during assembly of the planetary gear assembly 30. The flexible portions 152a, 152b, 152c, 152d, 152e, 152f can flexibly spring back to return to the equidistant dimension between the first, second, and third rotational axes after assembly. After assembly, the plurality of planetary gears 36*a*, 36*b*, 36*c* can be meshingly engaged between the sun gear 28 and the drive-side ring gear 32 and the output-side ring gear 34. The plurality of blade spring links 142*a*, 142*b*, 144*a*, 144*b*, 146*a*, 146*b* of the compliant planetary gear carrier 140 can allow a normally equidistant dimension between the plurality of planetary gears 36*a*, 36*b*, 36*c* to vary and prevent binding of the gear teeth of the plurality of planetary gears 36*a*, 36*b*, 36*c* with the gear teeth of the drive-side ring gear portion 32 and the output-side ring gear portion 34 of the split ring gear. It is contemplated that any suitable type of spring could be used for compliance between each of the plurality of planetary gears 36*a*, 36*b*, 36*c*.

A planetary gear assembly 30 can be assembled in an electric camshaft phaser 20 for dynamically adjusting a rotational relationship of a camshaft 22 of an internal combustion engine with respect to an engine crankshaft. The camshaft phaser 20 can include a planetary gear assembly 30 having a split ring gear with a drive-side ring gear portion 32 operably driven by a crankshaft through an endless loop power transmission member and an output-side ring gear portion, a plurality of planetary gears 36*a*, 36*b*, 36*c*, and a sun gear 28 centrally located and operably driven by an electric motor 24. Each of the plurality of planetary gears 36*a*, 36*b*, 36*c* can have a rotational axis. The method can include mounting the split ring gear including the output-side ring gear 34 concentrically with the sun gear 28 for connection to the camshaft 22, positioning a compliant planetary gear carrier 40, 140 supporting the plurality of planetary gears 36*a*, 36*b*, 36*c*, and meshingly interposing the plurality of planetary gears 36*a*, 36*b*, 36*c* between the sun gear 28 and the split ring gear including the output-side ring gear portion 34 and the drive-side ring gear portion 32. The output-side ring gear portion 34 can have a different number of teeth with respect to the drive-side ring gear portion 32 by a value corresponding to a multiple of the number of planetary gears 36*a*, 36*b*, 36*c*. The electric motor 24 can be rotatable at a speed equal with respect to the output-side ring gear portion 34 to maintain a constant phase position of the camshaft with respect to the crankshaft. The electric motor 24 can be rotatable at a varying speed with respect to the output-side ring gear portion 34 during a cam phase change of the camshaft with respect to the crankshaft. The compliant planetary gear carrier 40, 140 can allow variance of a normally equidistant distance between the rotational axes of at least two of the plurality of planetary gears 36*a*, 36*b*, 36*c* to selectively compensate for mechanical tolerances of the drive-side ring gear portion 32 and the output-side ring gear portion 34.

The method can further include mounting the plurality of planetary gears 36*a*, 36*b*, 36*c* to a corresponding plurality of shoulder pins 52*a*, 52*b*, 52*c*, pivotally connecting a plurality of blade spring links 142*a*, 142*b*, 144*a*, 144*b*, 146*a*, 146*b* between each of the plurality of planetary gears 36*a*, 36*b*, 36*c*, and fastening ends of each of the plurality of blade spring links 142*a*, 142*b*, 144*a*, 144*b*, 146*a*, 146*b* to the corresponding shoulder pins 52*a*, 52*b*, 52*c*. Each of the plurality of shoulder pins 52*a*, 52*b*, 52*c* can be located along the rotational axis of one of the plurality of planetary gears 36*a*, 36*b*, 36*c*. Each of the plurality of blade spring links 142*a*, 142*b*, 144*a*, 144*b*, 146*a*, 146*b* can have a flexible portion 152*a*, 152*b*, 152*c*, 152*d*, 152*e*, 152*f* extending between the fastened ends. The flexible portions 152*a*, 152*b*, 152*c*, 152*d*, 152*e*, 152*f* can be normally biased outwardly with respect to one another. The method can further include pressing the flexible portions 152*a*, 152*b*, 152*c*, 152*d*, 152*e*, 152*f* of the blade spring links 142*a*, 142*b*, 144*a*, 144*b*, 146*a*, 146*b* inwardly towards one another while interposing the plurality of rotatable planetary gears 36*a*, 36*b*, 36*c* between the drive-side ring gear portion 32 and the output-side ring gear portion 34 of the split ring gear. The method can further include releasing the flexible portions 152*a*, 152*b*, 152*c*, 152*d*, 152*e*, 152*f* of the blade spring links 142*a*, 142*b*, 144*a*, 144*b*, 146*a*, 146*b* after interposing the plurality of planetary gears 36*a*, 36*b*, 36*c* between the sun gear 28 and the split ring gear including the drive-side ring gear portion 32 and the output-side ring gear portion 34.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A planetary gear assembly (30) comprising: at least one ring gear (32, 34), a sun gear (28), and a plurality of rotatable planetary gears (36*a*, 36*b*, 36*c*) radially interposed between the at least one ring gear (32, 34) and the sun gear (28), each of the plurality of planetary gears (36*a*, 36*b*, 36*c*) having a separate spaced rotational axis with respect to other planetary gears (36*a*, 36*b*, 36*c*);

a compliant planetary gear carrier (40, 140) supporting the plurality of planetary gears (36*a*, 36*b*, 36*c*) for rotation and connected between each rotational axis of the plurality of planetary gears (36*a*, 36*b*, 36*c*), the compliant planetary gear carrier (40, 140) having at least one biasing member (48, 142*a*, 142*b*, 144*a*, 144*b*, 146*a*, 146*b*) connected between the rotational axes of two of the plurality of planetary gears (36*a*, 36*b*, 36*c*) and at least a portion of the compliant planetary gear carrier (40, 140) pivoting about a rotational axis of one of the plurality of planetary gears (36*a*, 36*b*, 36*c*) allowing variance of a distance between the axes of at least two of the plurality of planetary gears (36*a*, 36*b*, 36*c*) compensating for mechanical tolerances of the at least one ring gear (32,34).

2. The planetary gear assembly (30) of claim 1, wherein the at least one ring gear (32, 34) further comprises a split ring gear including a drive-side ring gear portion (32) for driven rotation by a first shaft and an output-side ring gear portion (34) located concentric with respect to the sun gear (28) for driving connection to a second shaft (22), the output-side ring gear (34) having a different number of teeth with respect to the drive-side ring gear (32) by a value corresponding to a multiple of the number of planetary gears (36*a*, 36*b*, 36*c*) to provide tooth alignment at an engagement position of each of the planetary gears (36*a*, 36*b*, 36*c*).

3. The planetary gear assembly (30) of claim 1, wherein the compliant planetary gear carrier (40) further comprises:

a first rigid link (42) and a second rigid link (44) connected for pivoting movement with respect to the rotational axis of a first planetary gear (36*a*), the first rigid link (42) connected between a first rotational axis of the first planetary gear (36*a*) and a second rotational axis of a second planetary gear (36*b*), the first rigid link (42) supporting the second planetary gear (36*b*) for slight movement with respect to the first planetary gear (36*a*), the second rigid link (44) connected between the first rotational axis of the first planetary gear (36*a*) and a third rotational axis of a third planetary gear (36*c*), the second rigid link (44) supporting the third planetary gear (36*c*) for slight movement with respect to the first planetary gear (36*a*); and, wherein the at least one biasing member comprises a spring (48) engageable between the first rigid link (42) and the second rigid link (44) allowing pivoting movement of the first rigid link (42) and the second rigid link (44) with respect to one another about the first rotational axis of the first planetary gear (36*a*).

4. The planetary gear assembly (30) of claim 1, wherein the compliant planetary gear carrier (40) further comprises:
a first rigid link (42) and a second rigid link (44) connected for pivoting movement with respect to the rotational axis of a first planetary gear (36*a*), the first rigid link (42) connected between a first rotational axis of the first planetary gear (36*a*) and a second rotational axis of a second planetary gear (36*b*), the first rigid link (42) supporting the second planetary gear (36*b*) for slight movement with respect to the first planetary gear (36*a*), the second rigid link (44) connected between the first rotational axis of the first planetary gear (36*a*) and a third rotational axis of a third planetary gear (36*c*), the second rigid link (44) supporting the third planetary gear (36*c*) for slight movement with respect to the first planetary gear (36*a*); and, wherein the at least one biasing member comprises a jack screw (50) engageable between the first rigid link (42) and the second rigid link (44), the jack screw (50) adjustable during assembly of the planetary gear assembly (30) and fixed after the plurality of planetary gears (36*a*, 36*b*, 36*c*) are assembled for meshing engagement between the at least one ring gear (32, 34) and the sun gear (28).

5. The planetary gear assembly (30) of claim 1, wherein the at least one biasing member comprises:
a plurality of blade spring links (142*a*, 142*b*, 144*a*, 144*b*, 146*a*, 146*b*), each of the plurality of blade spring links (142*a*, 142*b*, 144*a*, 144*b*, 146*a*, 146*b*) connected between the rotational axes of two of the plurality of planetary gears (36*a*, 36*b*, 36*c*).

6. The planetary gear assembly (30) of claim 5, wherein the plurality of blade spring links (142*a*, 142*b*, 144*a*, 144*b*, 146*a*, 146*b*) further comprises:
a pair of first blade spring links (142*a*, 142*b*) supporting a first planetary gear (36*a*) and a second planetary gear (36*b*) interposed between the pair of first blade spring links (142*a*, 142*b*), the first and second planetary gears (36*a*, 36*b*) pivotally connected for rotation about separate spaced rotational axes between a first rotational axis of the first planetary gear (36*a*) and a second rotational axis of the second planetary gear (36*b*);
a pair of second blade spring links (144*a*, 144*b*) supporting the second planetary gear (36*b*) and a third planetary gear (36*c*) interposed between the pair of second blades spring links (144*a*, 144*b*), the second and third planetary gears (36*b*, 36*c*) pivotally connected for rotation about separate spaced rotational axes between the second rotational axis of the second planetary gear (36*b*) and a third rotational axis of the third planetary gear (36*c*); and
a pair of third blade spring links (146*a*, 146*b*) supporting the first planetary gear (36*a*) and the third planetary gear (36*c*) interposed between the pair of third blade spring links (146*a*, 146*b*), the first and third planetary gears (36*a*, 36*c*) pivotally connected for rotation about separate spaced rotational axes between the first rotational axis of the first planetary gear (36*a*) and the third rotational axis of the third planetary gear (36*c*).

7. The planetary gear assembly (30) of claim 6 further comprising:
a plurality of shoulder pins (52*a*, 52*b*, 52*c*) corresponding in number to the plurality of planetary gears (36*a*, 36*b*, 36*c*), each of the plurality of shoulder pins (52*a*, 52*b*, 52*c*) located along the rotational axis of the corresponding one of the plurality of planetary gears (36*a*, 36*b*, 36*c*), each of the plurality of planetary gears (36*a*, 36*b*, 36*c*) mounted for rotation on a corresponding one of the plurality of shoulder pins (52*a*, 52*b*, 52*c*), each of the plurality of blade springs (142*a*, 142*b*, 144*a*, 144*b*, 146*a*, 146*b*) mounted to the corresponding one of the plurality of shoulder pins (52*a*, 52*b*, 52*c*); and
a plurality of crimp rings (54*a*, 54*b*, 54*c*, 54*d*, 54*e*, 54*f*) corresponding to the plurality of shoulder pins (52*a*, 52*b*, 52*c*), each of the plurality of crimp rings (54*a*, 54*b*, 54*c*, 54*d*, 54*e*, 54*f*) mounted at ends of the corresponding one of the plurality of shoulder pins (52*a*, 52*b*, 52*c*), the plurality of crimp rings (54*a*, 54*b*, 54*c*, 54*d*, 54*e*, 54*f*) fastening ends of the plurality of blade spring links (142*a*, 142*b*, 144*a*, 144*b*, 146*a*, 146*b*) to the corresponding plurality of shoulder pins (52*a*, 52*b*, 52*c*).

8. The planetary gear assembly (30) of claim 5, wherein each of the plurality of blade spring links (142*a*, 142*b*, 144*a*, 144*b*, 146*a*, 146*b*) further comprises:
a flexible portion (152*a*, 152*b*, 152*c*, 152*d*, 152*e*, 152*f*) extending between fastened opposite ends of each of the plurality of blade spring links (142*a*, 142*b*, 144*a*, 144*b*, 146*a*, 146*b*), the flexible portions (152*a*, 152*b*, 152*c*, 152*d*, 152*e*, 152*f*) of each of the plurality of blade spring links (142*a*, 142*b*, 144*a*, 144*b*, 146*a*, 146*b*) normally biased toward a planar shape, the flexible portions (152*a*, 152*b*, 152*c*, 152*d*, 152*e*, 152*f*) flexibly urged axially inwardly to decrease an equidistant dimension between the first, second, and third rotational axes during assembly of the planetary gear assembly (30) and flexibly springing back to return to the equidistant dimension between the first, second and third rotational axes after assembly.

9. A planetary gear assembly (30) in an electric camshaft phaser (20) comprising:
a sun gear (28) located along a longitudinal axis for driven rotation by a rotatable electric motor (24);
a split ring gear including a drive-side ring gear portion (32) for driven rotation by an engine crankshaft through an endless loop power transmission member and an output-side ring gear portion (34), the output-side ring gear portion (34) located concentric with respect to the sun gear (28) for driving connection to a camshaft (22), the electric motor (24) rotatable at a speed equal with respect to the output-side ring gear (32) to maintain a constant phase position of the camshaft with respect to the crankshaft, the electric motor (24) rotatable at a varying speed with respect to the output-side ring gear (32) during a cam phase change of the camshaft with respect to the crankshaft;
a plurality of rotatable planetary gears (36*a*, 36*b*, 36*c*) radially interposed between the sun gear and the split ring gear including the drive-side ring gear portion (32) and the output-side ring gear portion (34), each of the plurality of planetary gears (36*a*, 36*b*, 36*c*) having a separate spaced rotational axis with respect to other planetary gears (36*a*, 36*b*, 36*c*), the output-side ring gear portion (34) having a different number of teeth with respect to the drive-side ring gear portion (32) by a value corresponding to a multiple of the number of planetary gears (36*a*, 36*b*, 36*c*); and
a compliant planetary gear carrier (40, 140) supporting the plurality of planetary gears (36*a*, 36*b*, 36*c*) for rotation, at least a portion of the compliant planetary gear carrier (40, 140) pivots about a rotational axis of at least one of the planetary gears (36*a*, 36*b*, 36*c*), the compliant planetary gear carrier (40, 140) allowing variance of a normally equidistant distance between the separate spaced rotational axes of at least two of the plurality of planetary gears (36*a*, 36*b*, 36*c*) to selectively compensate for mechanical tolerances of the drive-side ring gear portion (32) and the output-side ring gear portion (34) of the split ring gear.

10. The planetary gear assembly (30) of claim 9, wherein the compliant planetary gear carrier (40) further comprises:
a first rigid link (42) and a second rigid link (44) connected for pivoting movement with respect to a first rotational axis of a first planetary gear (36*a*), the first rigid link (42) connected between the first rotational axis of the first planetary gear (36*a*) and a second rotational axis of a second planetary gear (36*b*), the first rigid link (42) supporting the second planetary gear (36*b*) for slight movement with respect to the first planetary gear (36*a*), the second rigid link (44) connected between the first rotational axis of the first planetary gear (36*a*) and a third rotational axis of a third planetary gear (36*c*), the second rigid link (44) supporting the third planetary gear (36*c*) for slight movement with respect to the first planetary gear (36*a*); and
at least one spring (48) engageable between the first rigid link (42) and the second rigid link (44) allowing pivoting movement of the first rigid link (42) and the second rigid link (44) with respect to one another about the first rotational axis of the first planetary gear (36*a*).

11. The planetary gear assembly (30) of claim 9, wherein the compliant planetary gear carrier (140) further comprises:
a plurality of blade spring links (142*a*, 142*b*, 144*a*, 144*b*, 146*a*, 146*b*), each of the plurality of blade spring links (142*a*, 142*b*, 144*a*, 144*b*, 146*a*, 146*b*) connected between the rotational axes of two of the plurality of planetary gears (36*a*, 36*b*, 36*c*), the plurality of blade spring links (142*a*, 142*b*, 144*a*, 144*b*, 146*a*, 146*b*) including:
a pair of first blade spring links (142*a*, 142*b*) pivotally connected between the first rotational axis of the first planetary gear (36*a*) and the second rotational axis of the second planetary gear (36*b*);
a pair of second blade spring links (144*a*, 144*b*) pivotally connected between the second rotational axis of the second planetary gear (36*b*) and the third rotational axis of the third planetary gear (36*c*); and
a pair of third blade spring links (146*a*, 146*b*) pivotally connected between the third rotational axis of the third planetary gear (36*c*) and the first rotational axis of the first planetary gear (36*a*), the first planetary gear (36*a*) interposed between the pair of first blade spring links (142*a*, 142*b*) and the pair of third blade spring links (146*a*, 146*b*), the second planetary gear (36*b*) interposed between the pair of second blade spring links (144*a*, 144*b*) and the pair of first blade spring links (142*a*, 142*b*), the third planetary gear (36*c*) interposed between the pair of second blade spring links (144*a*, 144*b*) and the pair of third blade spring links (146*a*, 146*b*).

12. The planetary gear assembly (30) of claim 11 further comprising: a plurality of crimp rings (54*a*, 54*b*, 54*c*, 54*d*, 54*e*, 54*f*) corresponding to a plurality of shoulder pins (52*a*, 52*b*, 52*c*), each of the plurality of crimp rings (54*a*, 54*b*, 54*c*, 54*d*, 54*e*, 54*f*) mounted at ends of the corresponding one of the plurality of shoulder pins (52*a*, 52*b*, 52*c*), the plurality of crimp rings (54*a*, 54*b*, 54*c*, 54*d*, 54*e*, 54*f*) fastening ends of the plurality of blade spring links (142*a*, 142*b*, 144*a*, 144*b*, 146*a*, 146*b*) to the corresponding plurality of shoulder pins (52*a*, 52*b*, 52*c*).

13. The planetary gear assembly (30) of claim 11, wherein each of the plurality of blade spring links (142*a*, 142*b*, 144*a*, 144*b*, 146*a*, 146*b*) further comprises:
a flexible portion (152*a*, 152*b*, 152*c*, 152*d*, 152*e*, 152*f*) extending between fastened opposite ends of each of the plurality of blade spring links (142*a*, 142*b*, 144*a*, 144*b*, 146*a*, 146*b*), the flexible portions (152*a*, 152*b*, 152*c*, 152*d*, 152*e*, 152*f*) of each of the blade spring links (142*a*, 142*b*, 144*a*, 144*b*, 146*a*, 146*b*) normally biased toward a planar shape maintaining a spring-biased equidistant dimension between separate spaced first, second, and third rotational axes, the flexible portions (152*a*, 152*b*, 152*c*, 152*d*, 152*e*, 1520) flexibly urged inwardly towards one another during assembly of the planetary gear assembly (30) reducing the equidistant dimension between the separate spaced first, second, and third rotational axes, and flexibly rebounding to return to the planar shape reestablishing the spring-biased equidistant dimension between spaced separate first, second and third rotational axes after assembly.

14. A method for assembling a planetary gear assembly (30) in an electric camshaft phaser (20) for dynamically adjusting a rotational relationship of a camshaft (22) of an internal combustion engine with respect to an engine crankshaft, the camshaft phaser (20) including a planetary gear assembly (30) having a split ring gear including a drive-side ring gear portion (32) operably driven by the crankshaft through an endless loop power transmission member and an output-side ring gear portion (34), a plurality of planetary gears (36*a*, 36*b*, 36*c*), and a sun gear (28) centrally located and operably driven by an electric motor (24), each of the plurality of planetary gears (36*a*, 36*b*, 36*c*) having a rotational axis, the method comprising:
mounting the split ring gear including the drive-side ring gear portion (32) and the output-side ring gear portion (34) concentrically with respect to the sun gear (28), the output-side ring gear portion (34) for connection to the camshaft (22), the output-side ring gear portion (34) having a different number of teeth with respect to the drive-side ring gear portion (32) by a value corresponding to a multiple of the number of planetary gears (36*a*, 36*b*, 36*c*), the electric motor (24) rotatable at a speed equal with respect to the output-side ring gear (32) to maintain a constant phase position of the camshaft with respect to the crankshaft, the electric motor (24) rotatable at a varying speed with respect to the output-side ring gear (32) during a cam phase change of the camshaft with respect to the crankshaft;
positioning a compliant planetary gear carrier (40, 140) supporting the plurality of planetary gears (36*a*, 36*b*, 36*c*) for rotation, the compliant planetary gear carrier (40, 140) allowing variance of a normally equidistant distance between the rotational axes of at least two of the plurality of planetary gears (36*a*, 36*b*, 36*c*) to selectively compensate for mechanical tolerances of the split ring gear including the drive-side ring gear portion (32) and the output-side ring gear portion (34); and meshingly interposing the plurality of rotatable planetary gears (36*a*, 36*b*, 36*c*) between the sun gear (28) and the split ring gear including the output-side ring gear portion (34) and the drive-side ring gear portion (32).

15. The method of claim 14 further comprising:

mounting the plurality of planetary gears (36*a*, 36*b*, 36*c*) to a corresponding plurality of shoulder pins (52*a*, 52*b*, 52*c*), each of the plurality of shoulder pins (52*a*, 52*b*, 52*c*) located along the rotational axis of one of the plurality of planetary gears (36*a*, 36*b*, 36*c*);

pivotally connecting a plurality of blade spring links (142*a*, 142*b*, 144*a*, 144*b*, 146*a*, 146*b*) between each of the plurality of planetary gears (36*a*, 36*b*, 36*c*);

fastening ends of each of the plurality of blade spring links (142*a*, 142*b*, 144*a*, 144*b*, 146*a*, 146*b*) to the corresponding shoulder pins (52*a*, 52*b*, 52*c*), each of the plurality of blade spring links (142*a*, 142*b*, 144*a*, 144*b*, 146*a*, 146*b*) having a flexible portion extending between the fastened ends, the flexible portions normally biased axially outwardly with respect to one another;

pressing the flexible portions (152*a*, 152*b*, 152*c*, 152*d*, 152*e*, 152*f*) of the blade spring links (142*a*, 142*b*, 144*a*, 144*b*, 146*a*, 146*b*) inwardly towards one another while interposing the plurality of rotatable planetary gears (36*a*, 36*b*, 36*c*) between the sun gear (28) and the split ring gear including the drive-side ring gear portion (32) and the output-side ring gear portion (34); and releasing the flexible portion (152*a*, 152*b*, 152*c*, 152*d*, 152*e*, 152*f*) of each of the plurality of blade spring links (142*a*, 142*b*, 144*a*, 144*b*, 146*a*, 146*b*) after interposing the plurality of planetary gears (36*a*, 36*b*, 36*c*) between the sun gear (28) and the split ring gear including the drive-side ring gear portion (32) and the output-side ring gear portion (34).

\* \* \* \* \*